(12) United States Patent
Howard

(10) Patent No.: X9397
(45) Date of Patent: Feb. 13, 1836

(54) GRATES, SLIDING

(76) Inventor: John C. Howard

I do not claim as my invention the furnace or grate, but I claim as my invention the improvement in the grate by which it is suspended on gudgeons and made to move by a handle as before described.
In testimony that the foregoing is a true description and specification of my said invention I have hereunto set my hand this twenty eighth day of August in the year of our Lord eighteen hundred and thirty five.

Witnesses                                        Nathan Winslow
G. E. Sewall
Samuel Fessenden } Drawing (432 wds) E.4.

W.G.

---

(2406) John C. Howard
Letters Patent (Patented February 13. 1836)

The Schedule referred to in these Letters Patent and making part of the same, containing a description in the words of the said John C. Howard himself of his Improvement in the sliding grate for fire-places, stoves &c.

To all whom these Presents shall come: Be it Known that I John C. Howard of Howard's Valley in the County of Windham & State of Connecticut have invented a new and useful improvement in the cast iron grate — and that the following is a full and exact description thereof. A grate passing in to the back of the chimney by means of a Cavaty in sd back — assisted with cast rollers running on a track. The back of sd grate raised to forty five degrees from front of grate to form a brace to support the same while in use. On the top of the sides of grate is locks passing in a groove to a lock & when togather holds the grate in a horizontal manner for use. The sise of Grate suited to Fire Places, Fire Frame or Stoves to which it may all be applyed. What I claim as my own invention & not previously known in the above described article is the manner of constructing this grate, and its appendages so as to be put in and out of the
chimney back fire frame or stove
Witnesses John C. Howard
C. H. M. Wharton )
A. Edmonston )

Exd
[illegible]. (2110 words)

---

Cullen Whipple. (Patented 11. June 1836.)

The Schedule referred to in these Letters Patent, and making part of the same, con-
taining a description in the words of the said Cullen Whipple himself of his improvement in the Take up Rod for
Weaving Looms.

Be it known that I Cullen Whipple of the town of Douglas in the County of Worcester
and State of Massachusetts, have invented a new and useful improvement in the Common Loom, called "Whipples
improved take up rod" which is described as follows, reference being had to the annexed drawings of the same, making
part of this Specification Take a common power Loom and remove all the apparatus for taking up the cloth or moving the Cloth beam.
The ratchet wheel, which is usually placed below the Cloth beam I place above it to bring it in contact with the catch
hereafter described. The Reed is held in a swing frame on bearings at the top. The Loom is in other respects the same as that
which is used generally. My improvement consists of a rod A which is placed on the backside of the Lathe about three
inches below the lower edge of the reed, hung on the bearings at each end. Upon this rod are two or more arms B. B. or
levers, which bear on the back of the reed frame: the bearing of which arms is regulated by a flat Spring C, passing from one
arm to the other, and held in the centre by a bolt D in the lathe which bolt is screwed in or out to regulate the thick-
ness of the cloth at pleasure. The rod before described has in addition to the levers a spring Catch E attached to a
lever F on one end of the rod. A small spring G presses upon the catch. This catch is calculated to play into the teeth
of the ratchet wheel and turn it with the cloth beam for winding up the cloth. This rod may be applied either on
the back or on the front of the Lathe, or on the breast beam; but I prefer the backside of the Lathe, as it can be placed
there to greater advantage than in either of the other places. The great object sought from the use of this rod is to keep
the reed parallel, and secure its power throughout its whole length - the motion from the reed frame having been
heretofore taken from one end.

The mode of obtaining the whole power of the reed by the machinery before described forms the distinguishing
feature of my improvement. In operating a Loom with my take up rod the catch upon the ends of the rod is de-
signed to come in contact with the ratchet wheel in a line with their centres. The catch when the filling is run
out, only comes so far in contact as barely to touch it, but does not move the ratchet wheel. When the filling causes the